United States Patent [19]

Ameen et al.

[11] Patent Number: 4,583,178
[45] Date of Patent: Apr. 15, 1986

[54] STRAPPED-DOWN INERTIAL SYSTEM FOR A VEHICLE

[75] Inventors: Yashwant K. Ameen; Rodney Pearson, both of Kent, England

[73] Assignee: Marconi Avionics Limited, England

[21] Appl. No.: 547,071

[22] Filed: Oct. 31, 1983

[30] Foreign Application Priority Data

Nov. 16, 1982 [GB] United Kingdom ................ 8232568

[51] Int. Cl.⁴ ............................................ G01C 21/18
[52] U.S. Cl. ..................................... 364/453; 244/3.2
[58] Field of Search ............. 364/453; 73/1 E, 178 R, 73/178 H; 244/3.2, 175, 176, 180

[56] References Cited

U.S. PATENT DOCUMENTS

| 3,260,485 | 7/1966 | Lerman et al. | 244/177 |
| 3,310,876 | 3/1967 | Yamron | 244/3.2 |
| 3,312,423 | 4/1967 | Welch | 244/3.2 |
| 3,338,166 | 8/1967 | Litman | 244/3.2 |
| 3,597,598 | 8/1971 | McAllister et al. | 364/453 |
| 3,924,824 | 12/1975 | Brodie et al. | 244/3.2 |
| 4,212,443 | 7/1980 | Duncan et al. | 244/177 |

FOREIGN PATENT DOCUMENTS 2004368 3/1979 United Kingdom .

OTHER PUBLICATIONS

"System Description and Performance Characteristics of a Quad Redundant Strapdown Inertial Navigation and Flight Control System" by P. J. Donoghue, IEEE Proceedings, Dayton, Ohio, May 1977.
"Leveling of Analytic Platforms" by F. Stanley, IEEE Transactions on Aerospace & Electronics Systems, vol. AE-5, No. 1, Jan. 1969.

Primary Examiner—Parshotam S. Lall
Attorney, Agent, or Firm—Kirschstein, Kirschstein, Ottinger & Israel

[57] ABSTRACT

A strapped-down intertial system for a vehicle including computational means and a sensor package. The sensor package includes a first part (1) fixedly mounted on the vehicle, and a second part (5) which is rotatable about a first axis (Z). On the second part (5) are fixedly mounted gyroscopic means (13, 15) responsive to rotation about two axes, one of which is the first axis (Z), and accelerometer means (9, 11) responsive to acceleration along two axes, one of which is not the same as either of the two axes of the gyroscopic means (13, 15). The computational means is arranged to calculate the heading of the vehicle from the outputs of the gyroscopic means and accelerometer means taken with the first part (1) stationary, and the second part (5) successively in at least three different angular positions about the first axis (Z).

3 Claims, 6 Drawing Figures

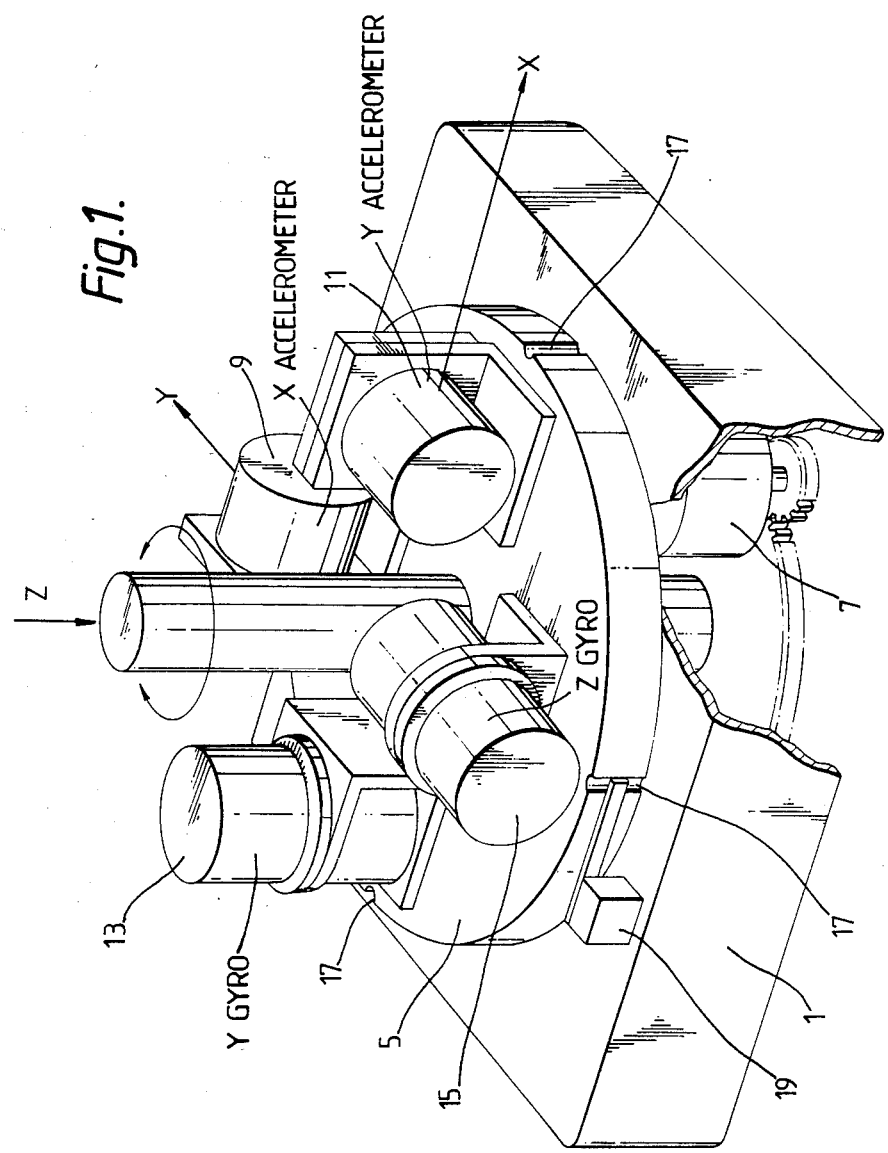

STRAPPED-DOWN INERTIAL SYSTEM FOR A VEHICLE

This invention relates to inertial systems, more particularly strapped-down inertial systems.

Inertial systems comprise a sensor package of gyroscopic means, accelerometer means and computational means for calculating heading and/or attitude and/or navigational data from the outputs of the accelerometer means and gyroscopic means according to the particular requirement. In a strapped-down system the sensor package is fixedly mounted on the frame of the vehicle in which the system is being used, so that the package axes are fixed with respect to the vehicle, and the sensor package experiences all the dynamic linear and angular motion of the vehicle. The gyroscopic means provide signals which relate to the components of the angular velocity of the vehicle about the package axes whilst the accelerometer means provide signals which relate to the components of linear acceleration of the vehicle along the axes. Where, as is typically the case, the computational means is required to calculate the heading of the vehicle e.g. the direction of the fore and aft axis of the vehicle with respect to north, whilst moving, it is necessary first to establish the initial heading of the vehicle when the vehicle is stationary. This is generally achieved by the process of 'gyrocompassing' which involves determining the precession rates of the individual gyros within the gyroscopic means about their axes, the precession rates, ω, being related to true north by the equation $$\omega = \Omega \cos \lambda \sin \Psi$$

where
Ω is the rate of rotation of the Earth about the polar axis,
λ is the latitude of the vehicle; and Ψ is the the angle between the axis of the respective gyro and due north.

Thus it is generally necessary for an operator to feed into the computer a value for the exact latitude (in the order of minutes of arc) of the vehicle and this may not be readily available. Furthermore the process of gyrocompassing involves taking very high accuracy measurements from the gryoscopic means usually under the worst conditions, i.e. shortly after switching the gyroscopic means on, and is inevitably a lengthy operation. It is an object of the invention to provide a strapped-down inertial system wherein these problems are alleviated.

According to the present invention a strapped-down inertial system for a vehicle includes computational means, and a sensor package comprising: a first part adapted to be fixedly mounted on said vehicle, and a second part which is rotatable about a first axis defined in said first part, said second part defining second and third mutually orthogonal axes, and fixedly mounted on said second part gyroscopic means responsive to rotation about two axes one of which is coincident with or parallel to the said first axis, and accelerometer means responsive to acceleration along two axes at least one of which is not coincident with or parallel to either of the said two axes of the gyroscopic means, the computational means being arranged to calculate the heading of said first part and, hence, of the vehicle from the outputs of said gyroscopic means and accelerometer means taken with the first part stationary and the second part successively in at least three different angular positions about said first axis.

Normally, the computational means is further arranged to subsequently calculate the heading of said first part, and hence the vehicle, from the initial calculated value of the heading and the outputs of said gyros and accelerometers taken with the second part in a single predetermined angular position with respect to the first part.

In one particular system in accordance with the invention said gyroscopic means are respectively responsive to rotation about said first and third axes, said accelerometer means are respectively responsive to accelerations along said second and third axes, and said computational means is arranged to calculate a quantity $A_\alpha$ for each of four angular positions of the second part with respect to the first part in which said second axis is respectively at angles α of 0°, 180°, 90° and 270° where α is measured with respect to a datum direction orthogonal to said first axis, the quantity $A_\alpha$ being given by the expression $$A_\alpha = \dot{\theta}_\alpha - (q_\alpha + \Delta q) \cdot \cos \phi_\alpha + r_\alpha \sin \phi_\alpha$$

where $\dot{\theta}_\alpha$ is the pitch rate of the second part at each position, $q_\alpha$ is the angular rate about said third axis at each position, $\Delta q$ is the gravity independent drift of the gyro responsive to rotation about said third axis, $\phi_\alpha$ is the roll angle of the second part at each position, and $r_\alpha$ is the angular rate about said first axis at each position, and the computational means is further arranged to derive the angle Ψ between north and the datum direction using the relation $$\tan \psi = \left[ \frac{A_0 - A_{180}}{A_{90} - A_{270}} \right]$$

One strapped-down inertial navigation system in accordance with the invention will now be described, by way of example only, with reference to the accompanying drawings in which FIG. 1 is a schematic diagram of the sensor package for the system;

Figure 2A:
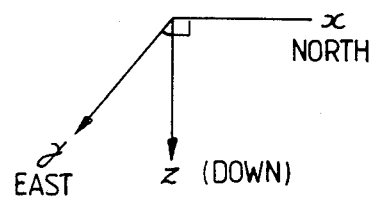
FIG. 2 is a schematic view of the three locally level geographic axes x,y z.
FIG. 2(b) is a schematic view of the three turntable axes X, Y, and Z.
FIG. 2(c) is a schematic view of the x, y and z axes showing the altered positions x', y' assumed by the x, y axes after rotation about the z axis through the Eulerian angle Ψ.
Figure 2B:
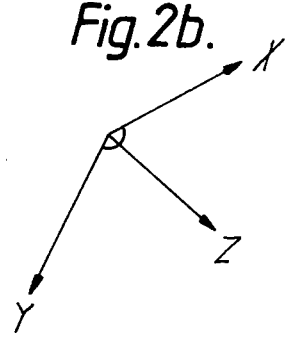
Figure 2C:
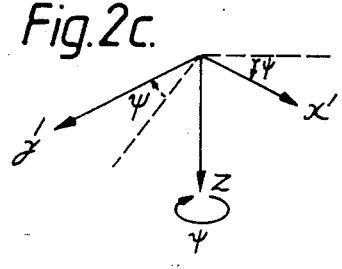
Figure 2D:
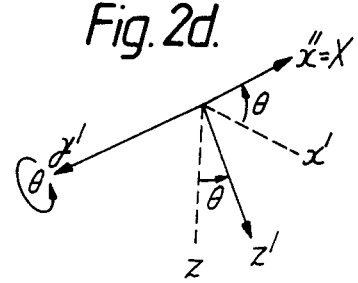
Figure 2E:
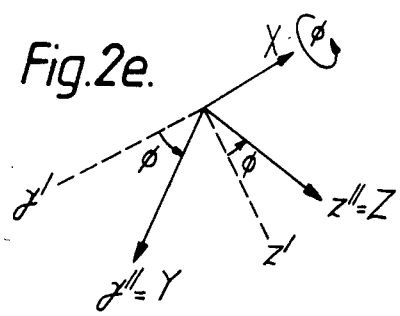

FIG. 2(d) is a schematic view of the x, y and z axes showing the altered positions of the x'', z' axes assumed by the axes x', z after a second (subsequent) rotation about the y' axis through the Eulerian angle θ; and FIG. 2(e) is a schematic view of the x, y and z axes showing the altered positions y'', z'' axes assumed by the y', z' axes after a third (subsequent) rotation about the x'' axis through the Eulerian angle φ.

The sensor package comprises a first part in the form of a casing 1, through which is rotatably mounted a second part in the form of a turntable 5. The turntable 5, driven by a stepping motor 7, is thus capable of rotation relative to the casing 1 about an axis, denoted by Z axis. Defined by the turntable 5, are two orthogonal axes, the X and Y axes both axes being orthogonal to the Z axis.

Mounted on the turntable 5 are an X accelerometer 9 and a Y accelerometer 11 positioned on the turntable to be responsive to accelerations along the X and Y axes respectively. Also mounted on the turntable 5 are a Y gyro 13, and a Z gyro 15 positioned on the turntable to be responsive to rotations about the Y and Z axes respectively. Round the periphery of the turntable 5 there are provided four detents 17, positioned at 90° intervals to lie along the ±X and ±Y axes. A latch mechanism 19 is provided on the casing 1 to co-operate with one of the detents 17 to lock the turntable in any one of four orientations relative to the casing 1.

In use the casing 1 of the sensor package is attached to the structure of a vehicle (not shown) so that with the turntable locked in any of the positions defined by the detents, the X and Y axes are aligned with, or orthogonal to the fore and aft axes of the vehicle.

It is well known that the locally level geographic axes x, y, z shown in FIG. 2(a) may be aligned with the turntable axes X, Y, Z shown in FIG. 2(b) by three successive rotations carried out in a specific order. These rotations are defined by three Eulerian angles $\Psi$ (heading), $\theta$ (pitch) and $\phi$ (roll).

First a rotation $\Psi$ is applied about the z-axis as shown in FIG. 2(c), then by $\theta$ about the y' axis as shown in FIG. 2(d) (where y' is the new orientation of the y-axis brought about by the $\Psi$ rotation), and finally by $\phi$ about the x″ axis as shown in FIG. 2(e) (where x″ is the new orientation of the x-axis brought about by the $\Psi$ and $\theta$ rotations, and moreover is the orientation of the X-axis of the table).

When the X-axis is parallel to the fore-and-aft axis of the vehicle, $\Psi$ is the vehicle's heading as well.

The system further includes a microprocessor (not shown) for processing data from the accelerometers 9, 11 and gyros 13, 15 to provide information about the vehicle's heading. In order to establish the initial heading of the vehicle with respect to the north whilst the vehicle is stationary, the turntable 5 is rotated so that the X axis lies along the fore-aft axis of the vehicle, the turntable then being locked in this position by the latch mechanism 19 and the appropriate detent 17. This position is then taken as the turntable datum orientation, i.e. $\alpha=0°$, where $\alpha$ is the angle of rotation of the turntable from the datum position. Readings of the acceleration about the X axis $a_{xo}$, acceleration about the Y axis $a_{yo}$, angular rate about the Y axis $q_o$, and angular rate about the Z axis $r_o$ are taken from the accelerometers 9, 11 and gyros 13, 15 respectively. The turntable is then rotated through 180°, and the readings $a_{x180}$, $a_{y180}$, $q_{180}$, $r_{180}$ taken. Two further sets of readings for $\alpha=90°$, and $\alpha=270°$ are then also taken.

It can be shown that for any of the four orientations of the turntable, i.e. $\alpha=0°$, 90°, 180°, 270° described above, allowing for slight casing movement about the X and Y axes, but assuming that the casing 1 is otherwise stationary $$\sin(\Psi+\alpha)\cdot\Omega\cos\lambda = \dot{\theta}_\alpha - q_\alpha\cos\phi_\alpha + r_\alpha\sin\phi_\alpha \quad (1)$$

where
$\Psi$ is the angle of the casing fore-aft axis with respect to North;
$\dot{\theta}_\alpha$ is the pitch angle for the particular value of $\alpha$, and is given by the expression $\sin^{-1}(a_{x\alpha}/g)$ where g is the acceleration due to gravity;
$\dot{\theta}_\alpha$ is the pitch rate for the particular value of $\alpha$ and is given by the expression $\dot{a}_{x\alpha}/(g\cos\theta_\alpha)$; and $\phi_\alpha$ is the roll angle for the particular value of $\alpha$, and is given by the expression $\sin^{-1}[-a_{y\alpha}/(g\cos\theta_\alpha)]$ Thus, all the quantities on the righthand side of equation (1) are measured quantities derived from the measurements of $a_{x\alpha}$ $a_{y\alpha}$ $q_\alpha$ and $r_\alpha$ for each value of $\alpha$. As in practice however the sensors have errors, the most important error being the g-independent drift of the Y gyro 11 which tends to change from switch-on to switch-on, but remains relatively constant during any one run, the actual quantity $A_\alpha$ which may be calculated from the sensor data to correspond to the expression on the righthand side of equation (1) at any one position $\alpha$ of the turntable 5 will also contain a term $\Delta q\cos\theta$ where $\Delta q$ is the gyro drift Thus, $$A_\alpha = \dot{\theta}_\alpha - (q_\alpha + \Delta q)\cos\phi_\alpha + r_\alpha\sin\phi_\alpha \quad (2)$$
$$= \sin(\psi+\alpha)\,\Omega\cos\lambda - \Delta q\cos\phi_\alpha$$

From the quantities $A_0$, $A_{90}$, $A_{180}$, $A_{270}$ calculated from the measurements of $a_{x\alpha}$ $a_{y\alpha}$ $q_\alpha$ and $r_\alpha$ for each value of $\alpha$, assuming that the vehicle attitude does not change appreciably, say less than one degree, over the set of measurements and as the term $\Delta q\cos\phi$ will be of the same magnitude but reversed in sign for the opposing angle measurements $\alpha=0°$, 180° and $\alpha=90°$, 270° it can be readily seen that $$\frac{A_0 - A_{180}}{2} = \Omega\cos\lambda\sin\psi \quad \frac{A_0 + A_{180}}{2} = \Delta q\cos\phi_0$$

$$\frac{A_{90} - A_{270}}{2} = \Omega\cos\lambda\cos\psi \quad \frac{A_{90} + A_{270}}{2} = \Delta q\cos\phi_{90}$$

Thus $\psi = \tan^{-1}\left[\dfrac{A_0 - A_{180}}{A_{90} - A_{270}}\right]$ and $$\Omega\cos\lambda = \tfrac{1}{2}[(A_0 - A_{180})^2 + (A_{90} - A_{270})^2]^{\frac{1}{2}}$$

with the average value of drift being given by $$\Delta q = \tfrac{1}{4}\left[\frac{A_0 + A_{180}}{\cos\phi_0} + \frac{A_{90} + A_{270}}{\cos\phi_{90}}\right]$$

i.e. the heading of the vehicle, $\Psi$, and the latitude of the vehicle $\lambda$ can be derived from the four sets of measurements, together with an indication of the average value of drift $\Delta q$.

Having initially determined $\lambda$ and $\Delta q$ as described above with the vehicle stationary, then $\Psi$ can be subsequently calculated by the microprocessor, as and when required, using readings from the sensors at any one position of the turntable 5 only using equation (2). If $\Psi$ is known approximately, generally $\alpha$ is chosen so that $|\sin(\Psi+\alpha)| < 1/\sqrt{2}$ so as to lie in the maximum slope region of $\sin(\Psi+\alpha)$ to achieve maximum sensitivity.

It will be appreciated that a particular advantage of the system described herebefore is that no operator input of latitude is required. Another particular advantage is that the number of sensors required is limited to two accelerometers, and two gyros, with the obvious cost and size advantages. Furthermore relatively inexpensive gyros may be used, having a switch-on to switch-on drift of for example 1° per hour in order to achieve gyro compassing accuracies comparable with those realisable with better class, e.g. 0.1°/hour gyros.

Whilst in the system described herebefore readings of the sensors at four different orientations of the turntables at 90° intervals with respect to the casing are taken, it is also possible using the same sensor configuration to derive the required heading data from three sets of measurements, taken at $\alpha=0°$, 120° and 240°. In some circumstances it may also be advantageous to take more than four sets of measurements, i.e. five or more.

We claim:

1. A strapped-down inertial system for a vehicle including computational means and a sensor package characterized in that it comprises: a first part adapted to be fixedly mounted on said vehicle, and a second part which is rotatable about a first axis defined in said first part, said second part defining second and third mutually orthogonal axes, and fixedly mounted on said second part gyroscopic means responsive to rotation about first and second directions one of which is parallel to the said first axis, and accelerometer means responsive to acceleration along third and fourth directions at least one of which is not parallel to either of said first and second directions the computational means being arranged to calculate the heading of said first part, and hence the vehicle, from the outputs of said gyroscopic means and accelerometer means only, the outputs being taken with the first part stationary and the second part successively in at least three different angular positions about said first axis.

2. A system according to claim 1 in which the computational means is further arranged to subsequently calculate the heading of said first part, and hence the vehicle, from an initial calculated value of the heading and the outputs of said gyroscopic means and accelerometer means taken with the second part in a single predetermined angular position with respect to the first part.

3. A system according to claim 1 in which said gyroscopic means are respectively responsive to rotations about said first and third axes, said accelerometer means are respectively responsive to accelerations along said second and third axes, and said computational means is arranged to calculate a quantity $A_\alpha$ for each of four angular positions of the second part with respect to the first part in which said second axis is respectively at angles $\alpha$ of 0°, 180°, 90° and 270° where $\alpha$ is measured with respect to a datum direction orthogonal to said first axis, the quantity $A_x$ being given by the expression $$A_\alpha = \dot{\theta}_\alpha - (q_\alpha + \Delta q) \cdot \cos \phi + r_\alpha \sin \phi_\alpha$$

where $\dot{\theta}_\alpha$ is the pitch rate of the second part at each position, $q_\alpha$ is the angular rate about said third axis at each position, $\Delta q$ is the gravity independent drift of the gyro responsive to rotation about said third axis, $\phi_\alpha$ is the roll angle of the second part at each position, and $r_\alpha$ is the angular rate about said first axis at each position, and the computational means is further arranged to derive the angle $\alpha$ between north and the datum direction using the relation $$\tan \psi = \left[ \frac{A_0 - A_{180}}{A_{90} - A_{270}} \right].$$

* * * * *